July 16, 1929.  J. DUBOIS ET AL  1,721,436
ANCHORING DEVICE
Filed Dec. 18, 1926   2 Sheets-Sheet 1
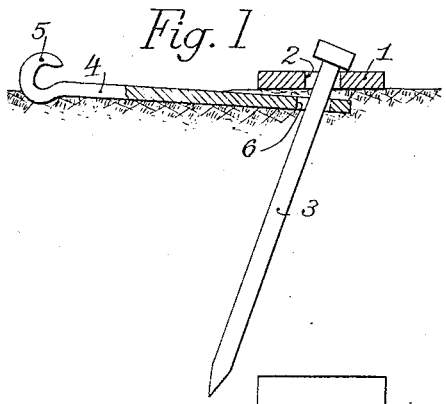
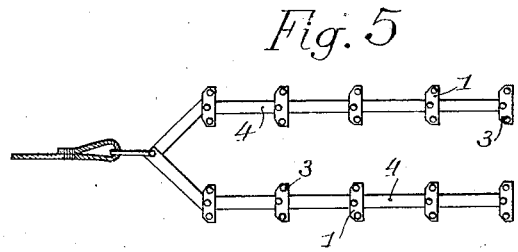
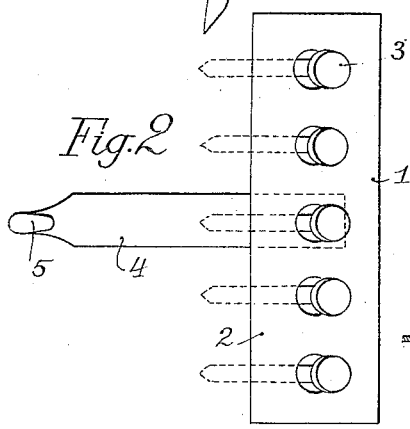
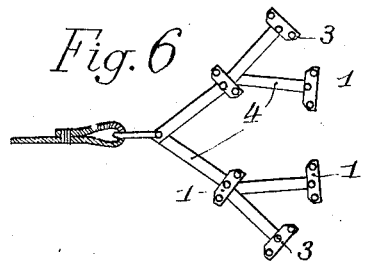
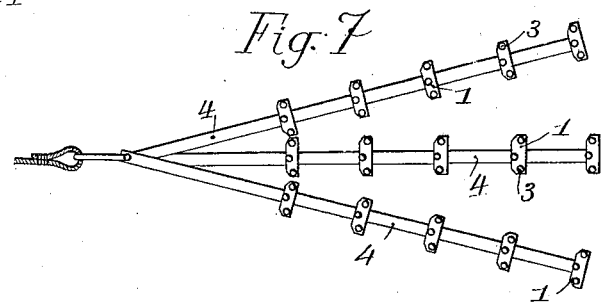
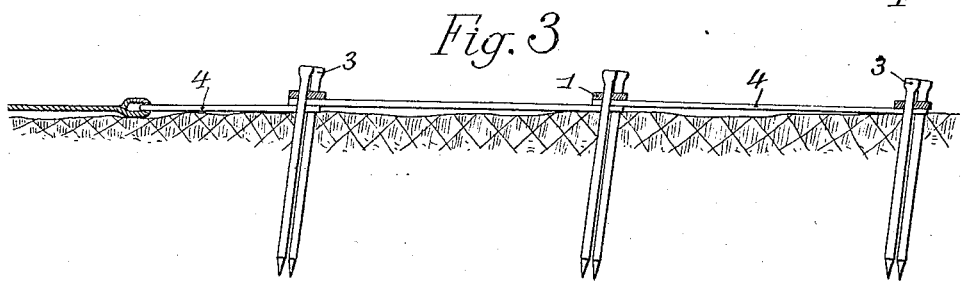
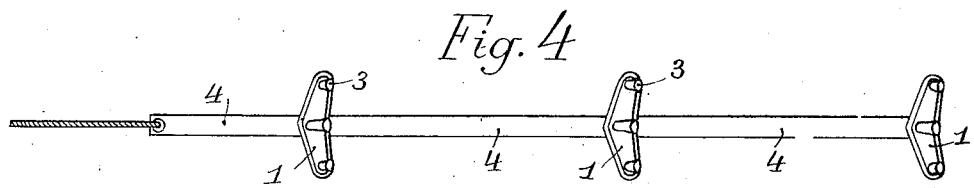
INVENTOR
JEAN DUBOIS
BERNARD PLANTADE
BY *Munn & Co.*
ATTORNEY July 16, 1929.  J. DUBOIS ET AL  1,721,436
ANCHORING DEVICE
Filed Dec. 18, 1926   2 Sheets-Sheet 2
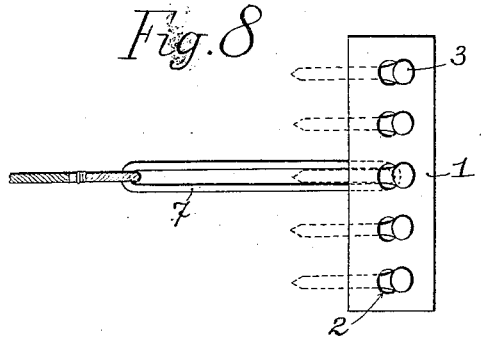
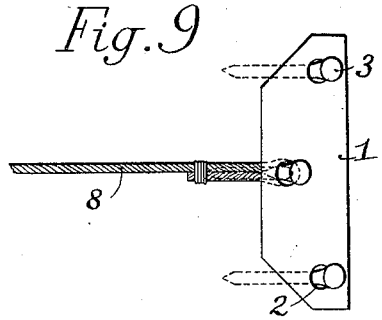
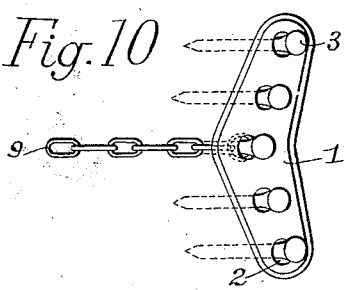
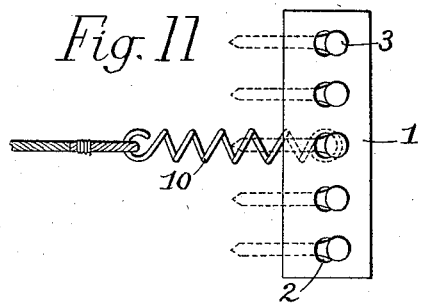
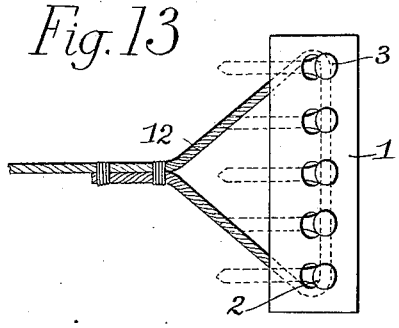
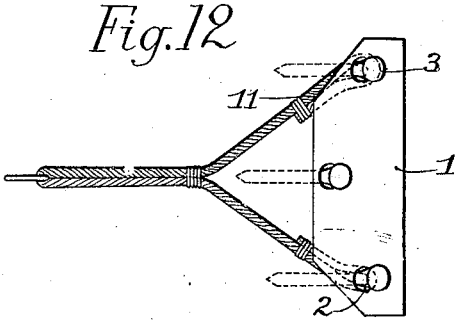
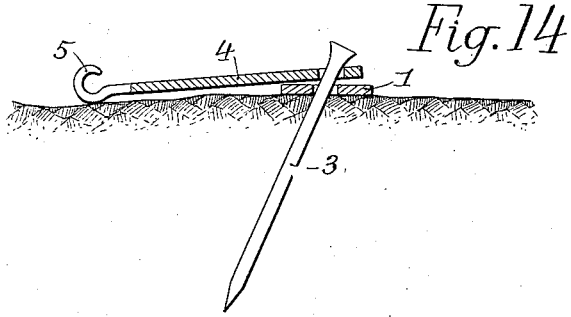
INVENTOR
JEAN DUBOIS
BERNARD PLANTADE
BY Munn&Co.
ATTORNEY Patented July 16, 1929.

1,721,436

UNITED STATES PATENT OFFICE.

JEAN DUBOIS AND BERNARD PLANTADE, OF PARIS, FRANCE.

ANCHORING DEVICE.

Application filed December 18, 1926, Serial No. 155,746, and in France December 28, 1925.

The present invention has for its object a simple and practical arrangement whereby we are enabled to form with great facility anchoring devices which are securely fixed in the ground and will support heavy horizontal traction.

We are thus enabled for example to constitute fixed points and attaching points for the supporting pulley apparatus which are employed in agricultural operations performed by the use of winches.

Our said devices comprises for this purpose a plate having a row of holes for the insertion of stakes which are driven into the ground, and a traction bar provided with an aperture which is engaged with one of the said stakes.

The appended drawing shows an embodiment of the invention.

Fig. 1 is a vertical section of the device, and Fig. 2 the plan view.

Figures 3 to 14 inclusive, illustrate various modifications and adaptations of the device and its constituent elements.

The said device comprises a plate 1 having the row of holes 2 for the insertion of the respective stakes 3 which are driven into the ground. The traction bar 4 is provided with a hook 5 at one end and an aperture 6 at the other end which is engaged upon one of the said stakes, for example below the plate 1.

According to the effort to be supported we may employ a plurality of unit anchoring elements Figs. 3 and 4, of the kind above specified, and herein the said elements are connected together by traction bars 4 and are placed in a single row; Fig. 5, a double row, or in triangular disposition, Figs. 6 and 7.

Several plates 1 and bar 4 may be replaced by a single plate having a greater number of holes for the insertion of the stakes.

The said anchoring device is chiefly adapted for agricultural work which is performed by the use of cables. The utilization of the said device may however be extended to all cases in which it is desired to constitute fixed points and attaching points for operations requiring the use of power, for the supporting pulleys of cables, for attaching tractors, or devices subjected to or producing traction, for the anchoring of aeroplanes upon the ground, or vessels to the shore, for attaching ropes or cables, or for like purposes.

We will further specify certain modifications which may be made without departing from the principle of the invention.

In a general manner, our said anchoring device comprises a plurality of stakes 3, a distributing device 1 and a traction element 4.

The distributing device 1, which serves to connect together all the stakes and to distribute the traction upon their whole number, does not necessarily consist of an apertured plate, and it may consist of a member or set of members having apertures for the stakes and adapted for the spacing of the latter in a rigid or an elastic manner, and said member or members may be given any suitable form.

Further, the traction member may consist of a rigid bar 4 comprising a hole or a hook, a strap 7 (Fig. 8) or the like which is attached to one of the stakes either by a cable 8 (Fig. 9), a chain 9 (Fig. 10), a spring 10 (Fig. 11) or the like. It may be so arranged as to be attached to two or more stakes instead of to a single stake; for instance if the matter relates to the use of a cable, the latter may end in two loops 11, Fig. 12, each engaging upon a respective stake, or the cable may comprise a large loop 12, Fig. 13, which is engaged upon two or more stakes. Instead of being placed below the distributing element, the attaching point of the traction element upon one or more stakes may be situated above this distributing element, as shown at 6, Fig. 14.

The external traction upon a unit anchoring member or on a set of several anchoring members may be exercised by hooking or attaching to one (Figs. 3 and 4) or to several traction elements (Figs. 5, 6 and 7).

The traction element and the distributing element may be distinct from one another (Figs. 1 and 2) or may be connected together by a joint, a hook or the like.

Obviously, the traction upon the anchoring device may be exercised either parallel with the ground or at any desired inclination.

Claims:

1. An anchoring device adapted to transmit to the ground an effort of traction, comprising the combination of a rigid bar provided with a number of holes placed along a line extending transversely to the effort of traction, stakes adapted to pass freely through the said holes and to be driven into the ground, and a traction element extending along the direction of the effort of traction and having its rear end freely articulated upon the stake which is in the middle hole of the said rigid bar, at a point situated between the bar and the ground.

2. An anchoring device adapted to transmit to the ground an effort of traction, comprising the combination of a set of traction bars made of flat iron placed the one after the other and provided with holes at their ends, rigid bars in each of which a row of holes are provided, and stakes adapted to pass freely through the holes of all the bars, the stakes which pass through the middle holes of the said rigid bars also passing through the holes of the respective ends of the adjacent traction bars.

3. An anchoring device adapted to transmit to the ground an effort of traction, comprising the combination of a rigid bar provided with a number of holes placed along a line extending transversely to the effort of traction, stakes adapted to pass freely through the said holes and to be driven into the ground, and a traction element extending along the direction of the effort of traction and having its rear end freely articulated upon one of said stakes, at a point situated between the bar and the ground.

4. An anchoring device adapted to transmit to the ground an effort of traction, comprising the combination of a set of traction bars made of flat iron placed the one after the other and provided with holes at their ends, rigid bars in each of which a row of holes are provided, and stakes adapted to pass freely through the holes of all the bars, one of the stakes of each rigid bar also passing through a hole of the respective end of the adjacent traction bar.

In testimony whereof we have hereunto affixed our signatures.

JEAN DUBOIS.
BERNARD PLANTADE.